US012700146B2

(12) United States Patent     (10) Patent No.:   US 12,700,146 B2

LeCesne et al.     (45) **Date of Patent:   *Aug. 4, 2026**

(54) SYSTEM FOR CONTEXTUAL DIMINISHED REALITY FOR META VERSE IMMERSIONS

(71) Applicants: AT&T Intellectual Property I, L.P., Atlanta, GA (US); AT&T Mobility II LLC, Atlanta, GA (US)

(72) Inventors: Terrel Michael LeCesne, Round Rock, TX (US); Eric Zavesky, Austin, TX (US); Jason Allen DeCuir, Cedar Park, TX (US); James H. Pratt, Round Rock, TX (US)

(73) Assignees: AT&T Intellectual Property I, L.P., Atlanta, GA (US); AT&T Mobility II LLC, Atlanta (GA)

( * ) Notice: Subject to any disclaimer, the term of this patent is extended or adjusted under 35 U.S.C. 154(b) by 120 days.

This patent is subject to a terminal disclaimer.

(21) Appl. No.: 18/641,703

(22) Filed: Apr. 22, 2024

(65) Prior Publication Data

US 2024/0290001 A1     Aug. 29, 2024

Related U.S. Application Data

(63) Continuation of application No. 17/668,069, filed on Feb. 9, 2022, now Pat. No. 11,995,739.

(51) Int. Cl.
    *G06T 11/00*     (2006.01)
    *G06V 20/20*     (2022.01)

(52) U.S. Cl.
    CPC .............. *G06T 11/00* (2013.01); *G06V 20/20* (2022.01); *G06T 2210/21* (2013.01)

(58) Field of Classification Search
    CPC ...... G06T 11/00; G06T 2210/21; G06V 20/20
                (Continued)

(56) References Cited

U.S. PATENT DOCUMENTS 9,679,194 B2 *   6/2017   Ra ........................ G06V 40/172
11,775,130 B2   10/2023   Oser
               (Continued)

FOREIGN PATENT DOCUMENTS

CA         3049846 C   *   6/2022   .......... G06T 19/006

OTHER PUBLICATIONS

"Remove objects with Content-Aware Fill", https://helpx.adobe.com/in/photoshop/how-to/content-aware-hide-objects.html, Jan. 6, 2022, 6 pgs.

*Primary Examiner* — Samantha (Yuehan) Wang
(74) *Attorney, Agent, or Firm* — Guntin & Gust, PLC; Dana B. LeMoine

(57) ABSTRACT

Aspects of the subject disclosure may include, for example, receiving information about an augmented reality (AR) environment which includes a plurality of objects and a user participating in the AR environment, the user viewing the AR environment through a user equipment, receiving context information for the AR environment, identifying a diminished reality (DR) object of the plurality of objects, wherein the identifying is responsive to the context information, modifying the AR environment to render the DR object invisible to the user viewing the AR environment through user equipment, monitoring movement of one or more objects of the AR environment including the DR object, and modifying visibility of the DR object to the user viewing the AR environment through user equipment as a notification of a possible collision between the user and the DR object, wherein the modifying is responsive to detecting a risk of collision. Other embodiments are disclosed.

20 Claims, 8 Drawing Sheets

(58) Field of Classification Search
USPC ........................................................ 345/619
See application file for complete search history.

(56)                       References Cited

U.S. PATENT DOCUMENTS

2013/0293586 A1*  11/2013  Kaino ..................... G06F 3/005
                                              345/633
2018/0204380 A1      7/2018  Kumar et al.
2022/0101593 A1*   3/2022  Rockel ................. A63F 13/655
2023/0080909 A1*   3/2023  Tomczek ........... G02B 27/0172
                                              381/300
2023/0206621 A1*   6/2023  Ayanoglu ............ H04L 12/1813
                                              382/190
2023/0252686 A1*   8/2023  LeCesne ................ G06V 20/20

* cited by examiner

100 source object classes from policy or explicit context

284

272

280

276

274 diminished
reality view
(DRV)

282

270

300

<u>600</u>

SYSTEM FOR CONTEXTUAL DIMINISHED REALITY FOR META VERSE IMMERSIONS

CROSS-REFERENCE TO RELATED APPLICATION(S)

The present application claims priority to and is a continuation of U.S. patent application Ser. No. 17/668,069, filed Feb. 9, 2022, all sections of the aforementioned application(s) and/or patent(s) are incorporated herein by reference in their entirety.

FIELD OF THE DISCLOSURE

The subject disclosure relates to a system for contextual diminished reality for metaverse immersions.

BACKGROUND

Immersive experiences using augmented reality, extended reality, virtual reality and other technologies are increasingly available in a variety of contexts for users. Such immersive experience permit a user to employ user equipment to view and interact with objects and other users in the immersive experience.

BRIEF DESCRIPTION OF THE DRAWINGS

Reference will now be made to the accompanying drawings, which are not necessarily drawn to scale, and wherein.

DETAILED DESCRIPTION

Figure 1:
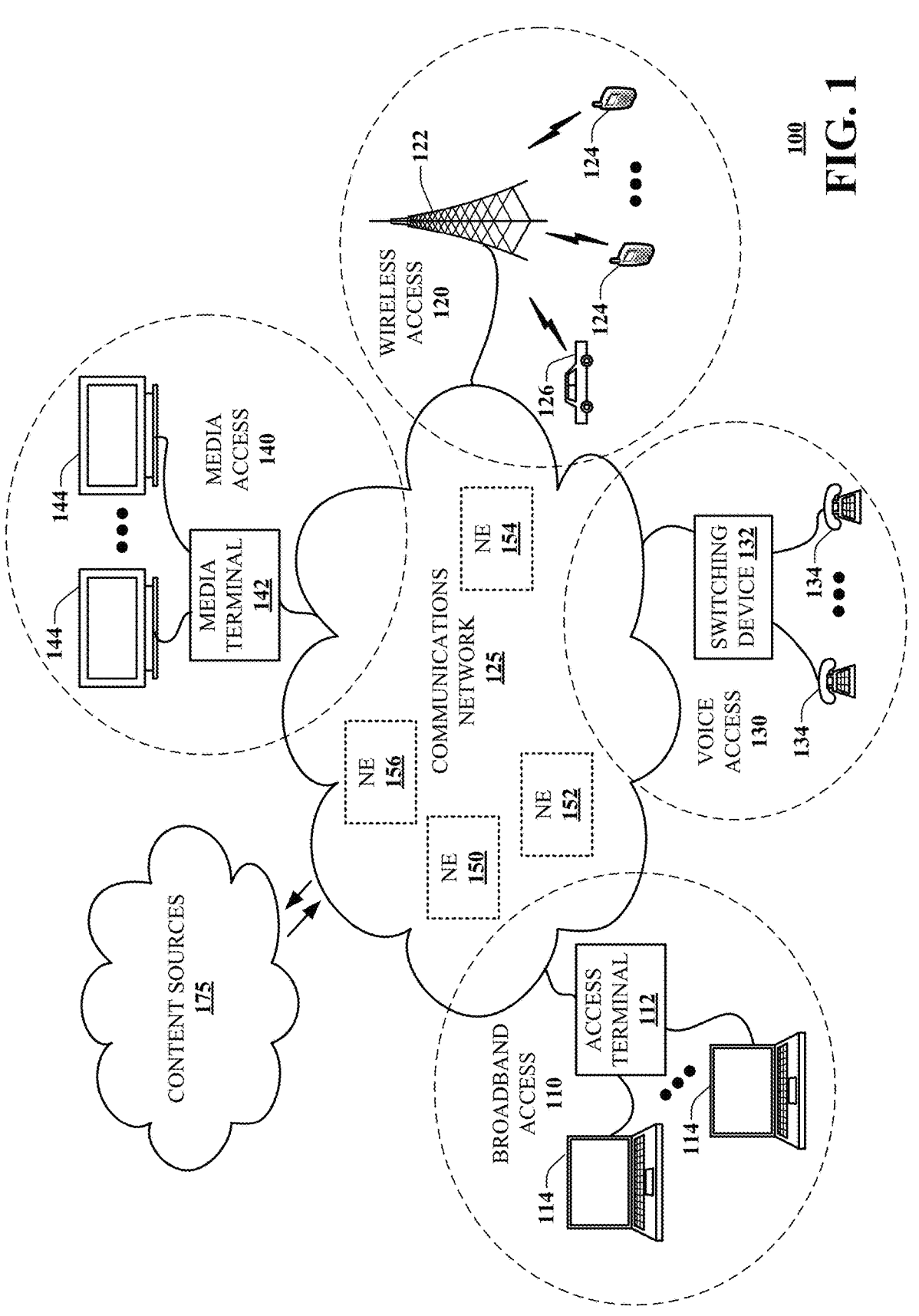
FIG. 1 is a block diagram illustrating an exemplary, non-limiting embodiment of a communications network in accordance with various aspects described herein.

The subject disclosure describes, among other things, illustrative embodiments for a system and method for an extended reality (XR) or augmented reality (AR) environment to facilitate the removal of visual objects with diminished reality (DR), but to keep such view modifications well-coordinated among participants in the environment. Other embodiments are described in the subject disclosure.

One or more aspects of the subject disclosure include receiving information about an augmented reality (AR) environment and a user participating in the AR environment, the AR environment including a plurality of objects including the user, receiving input information defining a diminished reality (DR) object of the plurality of objects and rendering the DR object invisible to the user in the AR environment. Aspects of the subject disclosure further include monitoring location and motion of the plurality of objects in the AR environment, detecting a risk of a possible collision between the user and the DR object, and notifying the user of the possible collision, wherein the notifying comprises modifying visibility of the DR object to the user responsive to the detecting a risk of the possible collision.

One or more aspects of the subject disclosure include receiving information about an augmented reality (AR) environment and a user, the user participating in the AR environment, the AR environment including a plurality of objects including the user, the user employing a user equipment to view the AR environment, receiving context information for the AR environment, and receiving a user profile for the user, the user profile defining user preferences of the user for the AR environment. Aspects of the subject disclosure may further include identifying a diminished reality (DR) object of the plurality of objects in the AR environment, wherein the identifying is response to the context information and the user profile, and providing AR information from the processing system to the user equipment, wherein the providing AR information comprises rendering the DR object invisible to the user employing the user equipment to view the AR environment.

One or more aspects of the subject disclosure include receiving information about an augmented reality (AR) environment which includes a plurality of objects and a user participating in the AR environment, the user viewing the AR environment through a user equipment, receiving context information for the AR environment, identifying a diminished reality (DR) object of the plurality of objects, wherein the identifying is responsive to the context information, modifying the AR environment to render the DR object invisible to the user viewing the AR environment through user equipment, monitoring movement of one or more objects of the AR environment including the DR object, and modifying visibility of the DR object to the user viewing the AR environment through user equipment as a notification of a possible collision between the user and the DR object, wherein the modifying is responsive to detecting a risk of collision.

Referring now to FIG. 1, a block diagram is shown illustrating an example, non-limiting embodiment of a system 100 in accordance with various aspects described herein. For example, system 100 can facilitate in whole or in part receiving information about an augmented reality environment including a user and a plurality of objects and to identify a diminished reality object in the augmented reality environment. The diminished reality object is rendered invisible to the user in the augmented reality environment and location and movement of objects in the augmented reality environment are monitored to avoid collisions with the diminished reality object. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
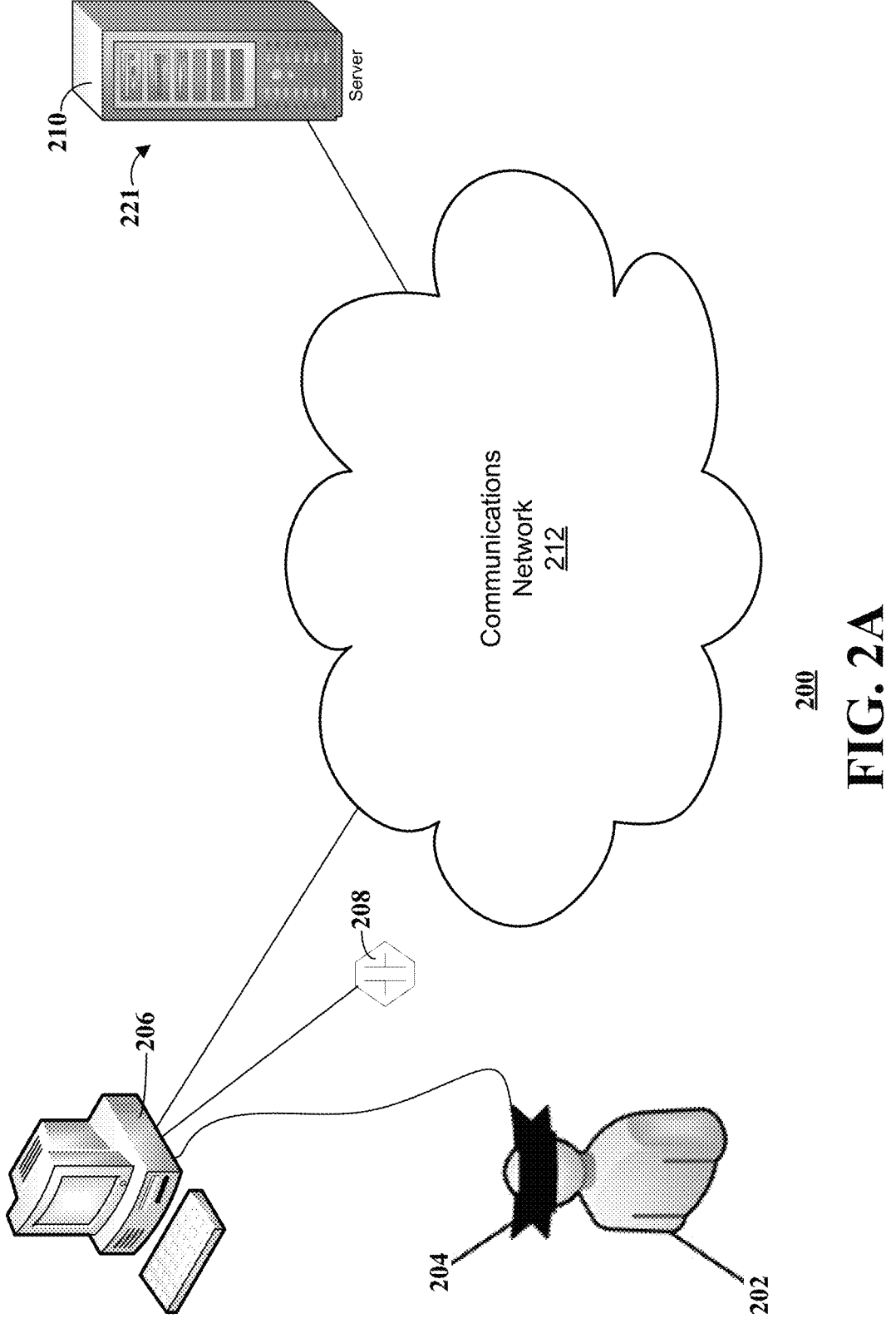
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning, for example, within the system 100 of FIG. 1 in accordance with various aspects described herein. The system 200 may be employed by a user 202 to experience an extended reality (XR), virtual reality (VR) or augmented reality (AR) environment. The terms XR, VR and AR may be used interchangeably to describe a virtual environment generated for a user such as user 202 by computer devices and wearable devices. The environment may include immersive experiences created using real-world content, such as panoramic or 360-degree video, synthetic or computer-generated content, or a combination of these. In some conventional systems, computer generated content is overlaid on real world content. However, conventionally, the computer-generated content and the real-world content are independent and do not respond to one another. The computer-generated content does not recognize physical objects in a real-world environment.

Diminished reality or DR is a complement to augmented reality. AR includes the addition of visual elements to an immersive environment experienced, for example, through a user-wearable device such as a headset or glasses or other display. DR uses image processing techniques to subtract or take away any likeness or image from an immersive environment. DR has many uses in disparate areas including gaming, entertainment such as theatrical presentations, safety, security and surveillance, and others as well.

In one example, in the presentation of live theatrical or musical performances, the use of special effects or props or scenery may be limited by presence of physical structures. Use of such props or scenery may be constrained by how the objects can physically be moved in real space in which the performance occurs. For example, a prop on a stage may be moved by an actor or by a live stagehand wearing dark clothing to reduce visibility, but the stagehand may remain at least partially visible to some audience members, diminishing the experience for them. One solution involves the addition of virtual stagehands who move objects in physical space without being seen. Through the use of DR, such virtual stagehands may be removed from view of the audience while physically moving or manipulating tangible objects of the performance space. This can enhance the experience of the audience as real objects and virtual objects occupy the view of the audience. Interactions with the physical objects by the performers strengthens the overall performance.

In another example, some live events may use cameras present in the event to capture images of the event. Examples include sporting events, and a specific example is video coverage of a bicycle race such as the Tour De France race. To capture images, one or more follow cars are positioned and move about near the competitors. If the follow cars or other equipment is visible to viewers, this can be distracting to the viewer experience. Similarly, if audience members or fans are visible in the video images, this can be distracting to viewers as well, particularly in the case of obnoxious or distracting fans, on-field cameras or camera operators and support personnel. Through the use of DR, such distractions may be removed from the images seen by viewers in an immersive experience.

In another example, DR may provide the ability to hide objects in images or video while maintaining physical capabilities of the hidden objects in the presentation of the images or video. For example, a camera at an event occupies a physical space in the environment with the event. However, the camera may be removed from images by use of DR and suitable image processing. Similar techniques may also be extended to new lines of products and services which are enabled through invisible devices, or are device rendered. For example, the ability to intentionally hide objects may create new opportunities for safety or marketing. As an example, a street sign may be visible to those physically present in an environment but may be rendered invisible for those engaged in an immersive experience. This can change the nature or some aspects of the experience for the viewer. Such objects may be apparent by do not obscure other features of the environment, such as natural objects in the environment.

In another example, some surveillance, safety, or security systems may be problematic to a sense of independence and overall well-being of viewers of an event or immersive experience. For example, if devices such as drones and cameras are present, such devices can enhance video presentation of the event and thus provide a public good but if they are visible to viewers, they can seem intrusive or even threatening to viewers. However, a drone or a camera can be made invisible through use of DR to eliminate or reduce the sense of intrusion or threat. Similarly, a person who is present in an environment may prefer to maintain anonymity or privacy. Rather than merely obscuring the person's image by blurring or pixelating that image, the person may be made fully invisible in the environment by application of DR. This can provide a reassurance to the person that privacy is being maintained. Further, this can eliminate need to obtain approval of persons to appear in the video presentation.

In another example, some crimes such as shoplifting and assault may happen because perpetrators perceive they are not being watched and can get away with the crime. Not knowing one is being watched but being told one is being watched can be a great deterrent and can also boost consumer confidence. A security camera or surveillance mechanism can be made invisible through use of DR to create apprehension in the mind of a potential perpetrator and prevent a crime occurring.

In addition, if an object is rendered so that that it is seen in the environment as another object, or is unseen, provision may be made for collision detection. Even though a physical object may not have its physical representation, the physical object is maintained as a physical entity that must be avoided or accounted for. For example, in a virtually presented theatrical performance, the audience sees a virtual representation of the performance through a VR headset, for example, in which stage hands are removed or made invisible to the audience. However, the performers involved in the performance are able to view the stage hands in their physical presence to prevent collisions or unintended interactions. Similarly, the biker in the Tour de France race can see the follow car mounted with the camera to be able to avoid colliding with the physical object. Thus, embodiments provide invisibility or reduced visibility to a diminished object but still maintain the presence of the object as a physical entity.

It is known to perform digital inpainting on, typically, a still image. A software routine such as Adobe Photoshop® may be used to reconstruct a missing or damaged area of a digital photograph or video. Such inpainting techniques can also be applied to object removal, text removal, and other automatic modifications of images and video, such as removing logos in images or videos. However, digital inpainting has not been applied to continuous action or presentation, including in an immersive environment in which occurrences or objects or persons in the presentation cause a response including diminished reality of one or more objects in a scene.

The system 200 in this embodiment enables a user 202 to continuously interact with an augmented reality (AR) environment. The system 200 in this embodiment includes user equipment such as a virtual reality (VR) headset 204 wearable by the user 202, one or more sensors 208, a user computer 206, and an augmented reality (AR) server 210 accessible over a communications network 212.

The VR headset 204 enables the user 202 to experience, generally, an AR environment, where XR is a general term intended to encompass XR, VR and AR systems, equipment and environments. The VR headset 204 generally includes a data processing system including one or more processors, a memory for storing data and instructions, and a communication interface. The VR headset 204 provides visual display to the user 202 and may include one or more display screens within the VR headset 204 to control the view seen by the user 202 and the environment experienced by the user. Further, the VR headset 204 may include a camera for capturing images of the environment of the user. The VR headset 204 may include speakers to provide sound information to the user 202 and the VR headset 204 may include one or more microphones to collect sound information about the environment of the user 202. In other embodiments, the VR headset 204 may be embodied as AR glasses or other wearable devices or may be operated in conjunction with a fixed display system such as a computer monitor, television or series of display screens in the physical environment with the user 202. The AR environment may be contained within a space such as a room or office where the user 202 is located. The AR environment may include in part or in full external locations such as a street location, a location in nature such as a forest, etc.

In some embodiments, the user equipment may be embodied as other than a VR headset 204. For example, if the user 202 is driving a vehicle, the windshield of the vehicle may include a display system for displaying an AR environment or scene or immersive experience. The displayed scene may include a mix of physical objects and people and virtual objects and people. The scene may be augmented to add features or diminished to remove features from the scene as viewed by the user 202.

In another example, the user equipment may include viewing devices for the user 202 to view or participate in an entertainment scene such as a play in a theater or a movie or television program. The entertainment scene may combine physical elements with virtual elements including augmentation and diminishment of the scene.

In another example, the user equipment includes a mirror or other display system including an arrangement allowing a user to see other individuals, virtually in the same space as the user. The mirror or display system creates the virtual reality that the others are present. In some embodiments, no wearable device, such as VR headset 204 is required. This arrangement may be used to enable a fitness workout with a trainer or other participant. Or this arrangement may be used to enable any type of engagement with other users, such as a virtual face-to-face meeting or conference.

In another example, in addition to or in place of the VR headset 204, the user equipment may include windows or other partitions that may provide electric shading. The partition may transition continuously from transparent to translucent to opaque and may be controlled by a user or by automatic control. The user 202 or other source may set the level of transparency according to any suitable standard. In a particular example, the system 200 may provide that some objects seen through the partition may be diminished or made invisible to the user viewing a scene through the partition. In an example, the glass that surrounds a hockey rink to separate viewers from the action on the ice may be controlled as user equipment to diminish an object on either side of the hockey glass. An object or person on the ice that should be invisible can be made so when viewed through the glass by operation of the system 200. Similarly, an object in the seats with the viewers can be diminished or made invisible when viewed through the glass by the system 200. In some embodiments, the hockey glass or other partition may be manipulated by the system 200 to accentuate or highlight a particular feature seen through the glass, such as by highlighting a particular player or an object such as the puck in play. Thus, in all examples, DR image processing includes not just diminishment or disappearance of an item, but modification of the appearance of the item as well.

The sensors 208 may include any sort of condition sensing and data collection apparatus suitable for the embodiment of the system. The sensors may include one or more cameras that collect images of the physical environment near the user 202. The cameras may collect visual images, infra-red images and others. The sensors 208 may include environmental sensors that collect information such as temperature, wind speed, orientation or acceleration, or other physical factors of the environment where the user 202 is located. If the user 202 is operating a vehicle, the sensors 208 may detect vehicle speed and steering, acceleration and braking inputs by the user 202. If the vehicle is a driver assisted vehicle, the sensors 208 may collect all information available to the driver assistance system such as images from cameras, navigation and location data, data from radar sensors, Lidar sensors, and others.

The sensors 208 may further gather information about the user 202. Such information may include biometric information, such as pulse rate or respiratory rate, skin conductivity, pupil dilation, haptic information about one or more touches of the user 202, and so forth. Thus, the sensors 208 may include or be part of a wearable device such as a watch, belt or harness. Further, such user data may include information about the position, posture and movement of the user. Any sort of data that may be useful by the system 200 for monitoring the user 202 and controlling the XR environment may be sensed by the sensors 208. In some embodiments, the sensors 208 merely sense a condition and report information. In other embodiments, one or more of the sensors 208 may be controllable, such as by the user computer 206. In some embodiments, some or all of the sensors 208 may be part of an internet of things (IoT) system or arrangement for communicating data and information from the sensors to another device for processing and evaluation.

The user computer 206 is in data communication with the VR headset 204 and the sensors 208. In the illustrated embodiment, the user computer 206 has wireline connections to the VR headset 204 and the sensors 208. In other embodiments, the wireline connections may be supplemented or replaced with one or more wireless connections, such as a Wi-Fi connection according to the IEEE 802.11 family of standards or a Bluetooth connection according to the Bluetooth standard.

The user computer 206 cooperates with the VR headset 204 to provide the AR environment for the user 202. The user computer 206 communicates with the VR headset 204 to provide video information, audio information and other control information to the VR headset 204. The user computer 206 communicates with the sensors 208 to collect information about the physical environment and the user 202. The user computer 206 communicates with the AR server 210 to provide video and other information from the VR headset 204 to the AR server 210 and to provide information and data from the sensors 208 to the AR server 210. The video and data may be sent in any suitable format, including encoding to reduce the amount of data transmitted or encrypted to maintain security of the data. The user computer 206 communicates to the VR headset 204 virtual reality information to the VR headset 204. In some embodiments, the functionality provided by the user computer 206 may be combined with the VR headset 204. In the embodiment of FIG. 2A, the user computer 206 is shown as a desktop computer. However, any suitable processing system, including one or more processors, memory and communications interface, may implement the functions of the user computer 206.

The AR server 210 controls provision of the XR environment to the VR headset 204 for the user 202. The AR server 210 generally includes a processing system including one or more processors, a memory for storing data and instructions and a communications interface. The AR server 210 may be implemented as a single server computer, as multiple server computers at one or multiple locations or in any suitable manner including location in the cloud or at an edge network. In the system 200, the AR server 210 implements an augmented reality (AR) engine 221 for managing the AR environment of the user 202. In some embodiments, the AR server 210 may implement in part or in whole a diminished reality (DR) application in accordance with some aspects described herein.

The AR server 210 receives over the communications network 212 information about the environment of the user 202, including location information, information about objects in the environment and events occurring in the environment. The AR server 210 in some embodiments may further receive information about the user 202, including biometric information and information about the performance of the user 202. The information may come from the sensors 208, the VR headset 204, or any other source. The AR server 210 provides control information over the communications network 212 including video information, sound information, haptic information and any other information, including instructions and data, to the other components of the system 200 including the user computer 206 and the VR headset 204.

The AR engine 221 develops the AR environment as a combination of the actual environment in which the user 202 is located and a simulated or virtual environment, to achieve ends such as training, education, performance improvement, and behavioral improvement for the user 202. For example, if the user 202 is being trained to operate an apparatus, the AR engine 221 may receive input information describing the user's control inputs for operating the apparatus, for example from the sensors 208. The AR server 210 may react to this input information, to measure the performance or behavior of the user 202. In response, the AR server 210 may modify the AR environment of the user 202. The AR engine 221 creates the AR environment, receives from the user 202 and the AR environment information about the performance of the user 202 in the environment as feedback, and in turn, modifies the AR environment to accomplish the desired end, such as training or behavioral modification for the user 202.

The system 200 may be supplemented with other equipment as desired or required for a particular purpose. For example, the system 200 may include one or more remote cameras to provide video information about the environment of the user. In one embodiment, where the system 200 is enabling education and training of the user on a particular device, one or more cameras may capture images of the device and its location in the environment. The images may be combined with images captured by other cameras, including a camera of the VR headset 204, and with virtual images produced by the AR server 210. Further, the system 200 may be supplemented with other wearable devices to provide additional feedback, such as haptic feedback to the user 202, or further sensors to collect information about the user 202 such as the heart rate and blood pressure of the user 202. The AR server 210 or other device, operating according to a DR application or other means, may operate to diminish or remove or alter the appearance of an object in the AR environment seen by the user 202.

The communications network 212 may include any combination of wireline and wireless communication networks, including but not limited to broadband access 110, wireless access 120, voice access 130 and media access 140 (FIG. 1). The communications network 212 may include the public internet and may provide access to other devices and services as well.

The system 200 thus creates or modifies visual information in an AR environment or immersive experience that correlates to observable behavioral changes in the user 202. Using cameras, microphones and other sensors, the system 200 detects objects in the scene viewed by the user 202 through the VR headset 204. Further, in some embodiments, the system 200 detects user biometric information to determine a status of the user 202, such as user anxiety and experience. The system 200 may draw on learned information available to the system 200, such as machine learning solutions, to understand the status of the user 202 as well as to understand the environment of the user 202 and objects in the environment. The system 200, by cooperation between the AR server 210 and the VR headset 204, may control the visual, audible and otherwise sensible environment of the user 202. For example, in the visual realm, the system 200 can substitute or erase non-essential objects for a task to be performed or experienced by the user. Further, the system 200 can provide immersive reinforcement for behavior of the user 202. This can be done for a wide variety of reasons, including to train the user 202 to new behaviors or to entertain, inform and engage the user. The system 200 thus provides an immersive experience for the user.

Figure 2B:
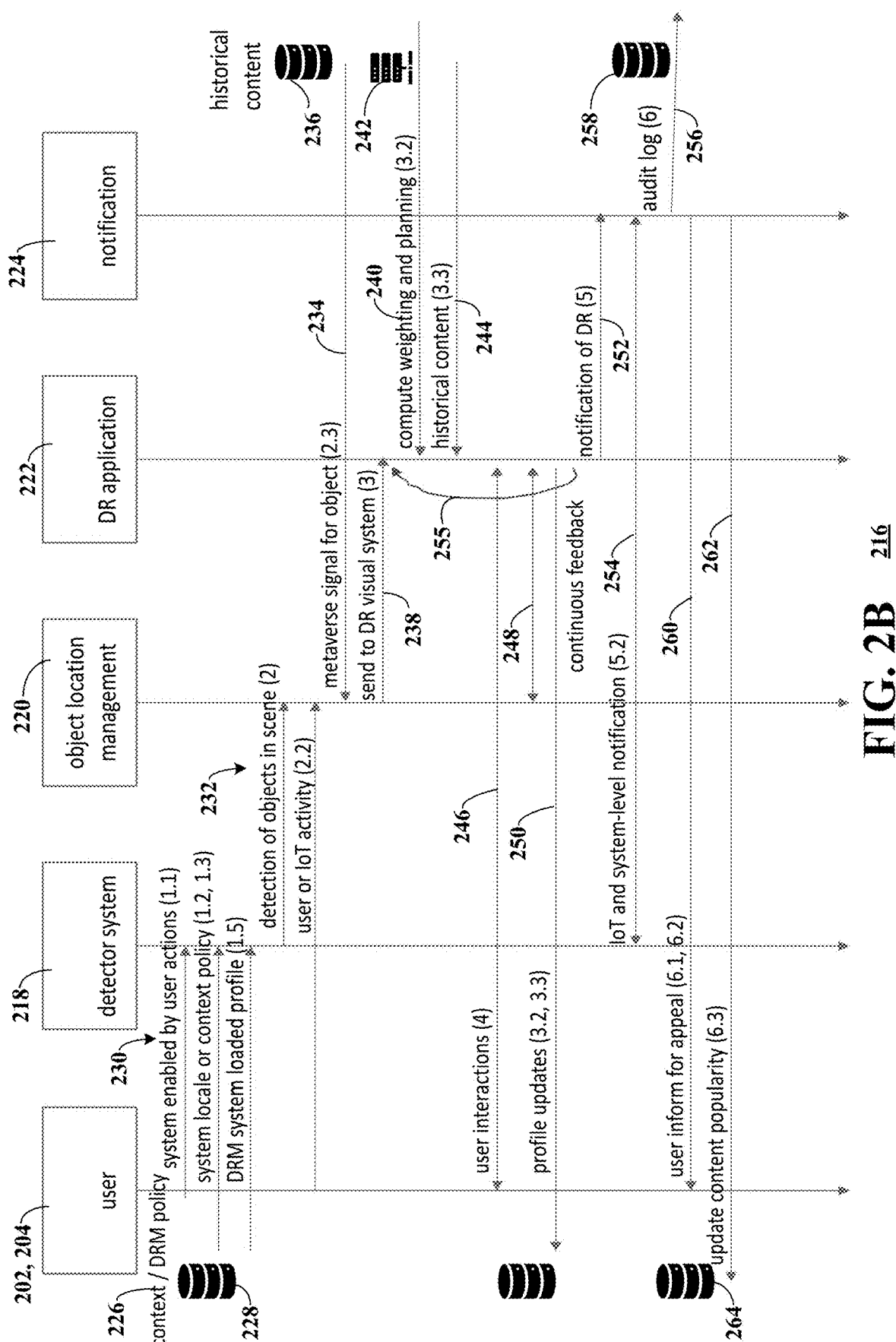
FIG. 2B is an illustrative embodiment of a method in accordance with various aspects described herein for facilitating the removal of visual objects with diminished reality (DR).

FIG. 2B is an illustrative embodiment of a method 216 in accordance with various aspects described herein for facilitating the removal of visual objects in an immersive experience or AR environment with diminished reality (DR). FIG. 2B illustrates interaction among the user 202 including user equipment such as VR headset 204, a detector system 218, an object location management system 220, a diminished reality (DR) application 222 and a notification system 224. The VR headset 204 or other user equipment as well as the detector system 218, the object location management system 220, the DR application 222 and the notification system 224 may be implemented by any suitable equipment including the AR server 210 and the user computer 206 of FIG. 2A. The functions of the noted features may be shared among components including components located in the cloud of processing elements accessible over communication networks including the public internet.

In FIG. 2B, the vertical columns are associated with components of an embodiment that implements the method 216. Horizontal lines illustrate interactions of this embodiment. The user 202 is the individual who perceives the AR environment created by the method 216. The user 202 interacts with the detector system 218 that has information about the environment that the user is viewing. The detector system 218 utilizes the object location management system 220 to develop information about and understand objects within a particular scene or context that the user is experiencing. The DR application 222 understands how to take historical content and other information and process the information for diminished reality of one or more features of the AR environment. The notification system 224 operates to control communication among the other systems.

The method 216 at step 226 may be initialized according to a context and a digital rights management policy. These may be retrieved from any suitable source such as a database 228 accessible over a network such as communications network 212 (FIG. 2A). At step 230, the user enables the system and the method 216 and opts into participation in the AR environment. If the user 202 does not opt in, for example, by agreeing to certain terms displayed on a display screen, the method 216 may terminate.

At step 230, the system is enabled for a class of objects. This information and information about the user and the AR environment is provided to the detector system 218. Further, at step 230, the information about the locale of the XR system and user, including the environment where the user is located, other objects or people present, etc., is provided to the detector system 218. Classes of objects may be contextually defined in the information provided to the detector system 218. The classes of the objects present are defined according to the context of the user 202 and the AR environment. Context information may be geographical information, time information, information about other people or objects present, etc. In an example, the context includes a theme park and a geofence within the theme park is defined so as to not visually capture other family members of the user 202. In some embodiments, at step 230, certain objects are specified or included in the context by an event. For example, in an event at a movie theater or a theatrical presentation, the detector system 218 can receive metadata about which objects may be subject to diminished reality and that are in the specific content of the AR environment. In some embodiments, optionally, at step 230, context information may include sensor information, such as biometric information like a pulse, etc., which may indicate which object can be diminished or substituted in the AR environment. Any suitable sensor information may be used from any sensor, such as sensors 208 in FIG. 2A.

Further, at step 230, for rights management, a DRM policy or profile may be accessed and provided to the detector system 218. For example, the user 202 may have established preferences or subscriptions that are stored in a user profile for the user 202. The user preferences may define how certain objects or situations are to be handled in the AR environment, including what objects are to be diminished or how the diminishment of certain objects is to be handled. The profile may be established by receiving input information from the user 202, such as through a web page when the user 202 accesses a service or system. In other examples, the profile may be established by learning the preferences of the user 202 by machine learning or artificial intelligence, or by transferring preference information from another source. For example, if the user 202 participates in social media such as Facebook®, information about the user account of the user 202 from the social media may be accessed and used to determine preferences of the user.

In another example, a corporate logo is visible in the physical environment where the user is located. The DR application 222 may attempt to diminish the corporate logo as being intrusive to the environment for the user 202, or for any other reason. However, the DRM policy may preclude diminishing intellectual property such as the corporate logo. Therefore, in this example, the DRM policy may override or limit or inform the operation of the DR application 222 so that the logo is not removed from view and remains visible. The DRM policy or profile may contain any suitable information for controlling or limiting diminishment of objects in the AR environment.

In some examples, the DR application 222 may automatically learn which items or elements of a scene are to be removed from or diminished in the scene. In one example, this may operate similarly to a smart spam filter such as by using machine learning or statistical techniques to identify an object to be diminished. For example, the DR application 222 may compare objects in a scene with object that have been diminished by other users viewing other scenes or similar scenes. A statistical comparison may be made and, if the scenes are sufficiently similar and the objects are sufficiently similar, the object may be automatically diminished. For example, a first similarity metric may be calculated for the current scene and one or more previously processed scenes. A second similarity metric may be calculated for the object and one or more objects processed in a similar scene. The first similarity metric may be compared with a first threshold value; the second similarity metric may be compared with a second threshold value. Based on the respective comparisons, the DR application 222 may conclude to diminish the object from the present scene.

In another example the DR application 222 may operate to automatically diminish an element of a scene by using biometric feedback. For example, one of the sensors 208 may measure a biometric aspect of the user 202, such as respiration rate or the focus of the gaze of the eye of the user 202. Based on this information, the DR application 222 may conclude that a particular object is annoying to the user 202 or is obstructing the view of the user 202 and may conclude to diminish the particular object.

In another example the DR application 222 may operate to automatically diminish an element of a scene based on context and user cohort, or a combination of these. For example, if the user 202 is a member of a group that routinely manually diminishes a particular object or class of objects in AR environments, the DR application 222 may recognize the user 202 and the AR environment and automatically diminish the object in the current scene. In other examples, if the current context matches a context in which the user 202 routinely diminishes an object or a class of objects, the DR application may recognize the user 202 and the context and automatically diminish the object in the present AR environment. As an example, if the user 202 is engaged in an AR environment featuring a golf match and the user 202 in the past has manually diminished physical crowds present at golf matches, the DR application 222 may automatically render invisible the crowds along the course in the current golf match. In some embodiments, the DR application 222 may first prompt the user 202 to approve the operation. In other embodiments, the DR application 222 may proceed automatically to take the determined action to diminish the object. The user 202 may manually reverse the automatic diminishment.

Further, the DR application 222 may recognize a particular context of the user 202 or the AR environment and automatically diminish an object or other item of the immersive experience. Automatic operation of the DR application 222 may change as the context changes. The context may include any suitable information or parameters, such as geographic location, time of day, individuals or objects present in the scene or approaching the scene or departing the scene, etc. For example, in an AR environment featuring a hockey game, the DR application 222 may recognize the on-going action in the game and determined to diminish referees from the view of the user 202 so that the referees become invisible and the user can better enjoy the action between the players. If a penalty is called, the context changes and the DR application 222 recognizes the new context. The DR application 222 operates to return the diminished referees to the scene as viewed by the user 202 so that the user 202 can view the referees and the assessment of the penalty.

At step 232, the detector system 218 begins monitoring the context of the user 202 and asks the object location management system 220 to detect objects in the scene. The context of the user 202 may include any available information about the environment of the user 202, such as physical location, presence of objects or persons in the scene, movement of persons and objects in the scene, etc.

The object location management system 220 may include a server located somewhere on a network in data communication with other elements such as the object location management system 220. The object location management system 220 may track an understanding of objects and their location in a virtual space in a scene that is being displayed to the user 202. The object location management system 220 maintains an understanding of the view of the user 202 as a part of the user device. The object location management system 220 can utilize the understanding of context of the user 202 to enable the DR application 222 to diminish the view of the user 202 of individual objects within the view of the user 202.

The object location management system 220 may receive information about objects in the scene and may use machine learning for visual recognition of the objects in the scene. Further, the object location management system 220 may receive information about movement of the user 202 as well as internet of things (IoT) information. Such IoT information may be received from one or more devices such as sensors 208. For example, the information received by the object location management system 220 may include standard camera or microphone capture of images or sounds. The information received in step 232 may further include location updates from an IoT device to the location management system to inform that some object or person is approaching the user in the AR environment.

In another example, at step 234, the object location management system 220 may receive metaverse signals from another system. In one definition, the technologies that form the metaverse can include virtual reality, including persistent virtual worlds that continue to exist even when a user is not active in an immersive environment. Metaverse technology can also include augmented reality that combines aspects of the digital and physical worlds. Metaverse examples may include a digital economy and commerce and permit an object to be purchased on one platform and carried to another platform. A metaverse object persists virtually but has influence when a user is interacting physically in the environment with the metaverse object. Such metaverse objects or information or signals received by the object location management system 220 may inform the object location management system 220 about a new object that should be deleted or diminished from view of the user 202.

In an example, a first metaverse company wants to erase a proprietary object from views in AR environments of a second metaverse company based on a status of the user 202 as a customer of the first metaverse company. In another example, the metaverse signals may include historical information about past activities and places visited by the user 202 to control what objects are diminished in the AR environment. The historical information may be retrieved from any suitable source such as a database 236. Previous learning by the system about the user 202 may thus be applied to a current situation in the AR environment.

Additionally, the object location management system 220 may track the presence of objects that have been diminished and those that have not been diminished to facilitate an obstacle and collision avoidance system. Even though an object is rendered invisible to the user 202, the object location management system 220 maintains awareness of the location and movement and physics of the object.

At step 238, the object location management system 220 sends collected information to the DR application 222. The collected information may include information from image or visual recognition systems, information from sensors including cameras and microphones, one or more metaverse signals such as from the historical content database 236. The DR application 222 uses the information received from the object location management system 220 to determine what objects should be diminished in the scene. In an example, the user 202 is viewing a physical site such as the Mount Rushmore monument. The scene as viewed by the user 202 includes the actual monument but also objects such as people near the viewpoint of the user 202, trees, signs fences and other obstructions. To enhance the view of the user 202, the DR application 222 operates to diminish from the view of the user the interfering objects.

As used herein, diminishment from view includes any alteration of the appearance of an item in the view of the user 202 experiencing an AR environment. Items may include objects or persons, physical and virtual. Alteration of appearance may include rendering the item invisible to the user 202, such as by modifying portions of the view, deleting portions of the view, replicating and replacing portions of the view, replacing the item with another item, and any other suitable image processing technique. Alteration of appearance may include enhancing appearance such as by showing the item in outline or profile only, showing the item as translucent or semi-opaque, or by adding color, graphics or other treatments to the item so as to make the item more visible in the AR environment. For example, an item may be initially rendered invisible to the user 202. If a risk of collision between the user 202 and the item is detected, the item may be made visible and even overlaid with bright flashing colors to alert the user 202 to the risk of collision. Diminishment includes any modification to the appearance of an item to the user 202 to achieve a particular current purpose in the AR environment.

In some embodiments, the object location management system 220 and the DR application 222 may be located remotely from the user 202 such as at AR server 210 (FIG. 2A) or at a centralized facility accessible over a network such as communications network 212 (FIG. 2A). For example, the object location management system 220 and the DR application 222 may be part of a service offered by a service provider as part of a gaming system or other XR system. The service may be offered to users such as the user 202, for example on a subscription basis. In another example, the object location management system 220 and the DR application 222 may be instantiated in a cloud computing environment, where processing is done across one or more servers accessed as required.

In some applications, processing must happen very quickly, such as substantially in real time. Substantially in real time may generally comprise an amount of time, such as for processing and for latency, which is imperceptible to the user. An example may be the detection in a scene viewed by the user 202 of an object that must be diminished, along with the time to process the scene to replace or make invisible the detected object. Some embodiments may accomplish this in approximately 100-200 ms. Other timing may be acceptable, as well, and still be imperceptible to the user 202. For such applications where scene processing must happen very quickly, the object location management system 220 or the DR application 222, or both, may be moved from a centralized facility to a local facility. The local facility may be all the way at the display device of the user 202, such as VR headset 204 worn by the user 202 or a local computer 206 of the user (FIG. 2A), or to an edge server in a network or in a cloud service.

The user 202 should be able to enjoy a smooth and continuous understanding of what is going on in the immersive environment created by the VR headset 204 or other equipment for the user 202. The metaverse created for the user 202 should stay current as perceived by the user 202. However, the metaverse includes people and objects so it is in a constant state of change. For functionality in the real world and the metaverse, they must be aligned in time and in space. The components forming the object location management system 220 and the DR application 222 may be chosen and positioned to best meet user needs for the AR environment or metaverse. Modifications to the AR environment by the system 200 and the method 216 should be generally imperceptible to the user.

The DR application 222 operates to alter the view seen in the AR environment by the user 202. In some embodiments, the DR application 222 identifies objects to be diminished from the view. At step 240, the DR application computes weights of objects in the scene. Such computation may be done by any suitable device, such as a processing system 242 including one or more processors and memory. In embodiments, the DR application 222 diminishes from the view of the user 202 selected objects or persons or other aspects of the view. Any suitable technique for diminishment may be used, including rendering an item invisible, such as by blurring a portion of the image in the AR environment, pixelating a portion of the image, removing from the image an object or other portion, and substituting one object or portion of the image for the diminished object or image.

The DR application 222 receives a variety of inputs to use in computing weights and planning to diminish one or more objects from view in the scene. At step 244, the DR application may receive as an input historical content. The historical content may be retrieved from any suitable storage location such as historical content database 236. The historical content may be substituted for a selected portion of the image to diminish the selected portion of the image. The historical content may be related to the view or the scene or the AR environment. In the example involving viewing the Mount Rushmore monument, if a sign has been recently placed in the location of the viewpoint of the user 202, obscuring a portion of the view, the DR application may retrieve from a historical content source such as an online image database an image from the viewpoint of the user 202 recorded before the sign was placed. In other examples, the historical content may relate to the user 202. For example, if the user 202 has previously visited the Mount Rushmore viewpoint before the placement of the sign, a recording or other stored image associated with the previous visit may be accessed by the DR application 222.

Based on the received input information, the DR application 222 develops a learning system to determine what needs to be included in the view of the AR environment as well as what may be or should be diminished from the view. The DR application 222 also responds to the user feedback from the user 202 if the user 202 prefers that a diminished item remain visible in the view or prefers that an item be diminished in the view.

At step 246, the DR application 222 receives as an input information about user interactions with objects in the AR environment. In some embodiments, the DR application 222 provides suggestions to the user 202 to remove a view or an object for particular purpose. Such suggestions may be made in any suitable manner, such as by playing audio to the user 202 through a headset, speaker or other equipment, or by displaying text or graphics in the view seen by the user 202. In an example, the DR application conveys data to the equipment used by the user to announce, "this nature shot would be better if you removed these trees." A user response from the user 202 to the suggestion may be received in any suitable manner. For example, the DR application 222 may receive data or information defining an activation by the user, such as a simple button press, an activation of a portion of a touch screen sensor, a swipe on a screen or display, or a cut-out specification to delete an object from the view seen by the user 202.

Further, if sensors such as sensors 208 (FIG. 2A) are present, determination of user interaction with objects in the AR environment can also be linked to additional biometric information from the sensors. In an example, if a user's heart rate and respiration rate are monitored and one or both exceed predetermined thresholds, the DR application 222 may conclude to remove an object from the view shown to the user as being too stressful or causing a too-severe reaction in the user.

In some embodiments, the DR application 222 may provide to the user 202 an option to add the user 202 to a diminished reality view of a nearby capture. In some embodiments, the DR application 222 may provide to the user a diminished reality user interface to control various aspects and functions of the DR application 222. For example, the DR application may provide a menu system that the user 202 may view and interact with to control operation of the DR application 222. Such control may include features for selecting which objects should or should not be diminished by the DR application 222, whether to capture an AR environment based on the current surroundings of the user 202 and whether to add the user 202 to the captured AR environment. The user interface may include controls of the VR headset 204 or other user equipment or the user interface may include soft controls such as a menu system displayed on a touch-sensitive screen for the user.

In some embodiments, the DR application 222 may periodically or continuously interact with the user 202 to provide notifications about operation of the DR application 222 and to receive input control from the user 202. For example, the DR application may provide a passive notification to the user 202 that an object has been diminished. The notification may be provided in any suitable manner, such as an audible announcement or text or graphics shown to the user in a user display. The notification may provide the user an option to re-enable the diminished object or to reverse the diminishment of the object. Upon receipt of an indication from the user, the DR application 222 may return the object to view by the user in the display.

Also, in some embodiments, the DR application 222 may provide a debug mode of operation for interaction with the user 202. In this mode, objects which have been diminished from view to the user 202 are specifically highlighted in the view by the DR application 222. This may be done by showing the diminished objects in outline view, in a high-lighted view, etc. The debug mode may be useful to the user 202 for reviewing the operation of the DR application 222, controlling the operation of the DR application 222 and for specifying user preferences of the user 202 for subsequent use by the DR application 222. When the object or similar objects are encountered in the future, the DR application 222 may render the object in accordance with the user preferences obtained during the debug mode of operation.

At step 248, the DR application 222 receives as an input updated information and continuous feedback from the object location management system 220. For example, as objects move in the AR environment, the object location management system 220 provides data and information about the movement and other changes. If the moving object is a diminished object, or one that the DR application 222 has selected for diminishment from view, the DR application 222 must update information it uses for diminishing the object in the scene. If a new object enters the scene, as reported by the object location management system 220 at step 248, the DR application 222 must decide if that new object should be displayed normally to the user 202 or should be diminished. The feedback received by the DR application 222 at step 248 may be used in any suitable manner by the DR application 222 for updating or modifying its understanding of the AR environment displayed to the user 202.

At step 250, the DR application 222 provides updates to the user profile for the user 202. The updates may include information based on the feedback received at step 248 from the object location management system 220 and from the user interactions received at step 246. For example, if the user 202 directed the DR application to not diminish a traffic sign from the view seen by the user 202 in the view, the user profile will be updated to include information about that occurrence. The information may be used later by the DR application 222 in subsequent AR environments to decide by the DR application whether to diminish from view other traffic signs. The updated profile may be stored in any suitable location, such as database 228.

At step 252, the DR application 222 provides notifications about its activity to diminish objects in the view shown to the user 202. In the illustrated embodiment, the DR application provides DR notification information to the notification system 224. The notification system 224 can provide further information or notifications based on the received DR notification information from the DR application 222. Thus, at step 254, the notification system 224 can provide information and notifications to other equipment associated with the AR environment such as IoT components, the VR headset 204 worn by the user 202, the local computer 206 and the sensors 208 (FIG. 2A).

For example, the notification system 224 may send information about the presence of a physical object that has been diminished by the DR application 222 to non-user systems as a higher alert that may require a response or even an urgent response. In an example, the notification system 224 may provide information about a physical object diminished from the view shown to the user 202 to tell an autonomous car that there is a hazard nearby that the user cannot see because of the diminishment. In another example, the notification system 224 may communicate information to inform other individuals or systems that they have been diminished in the AR environment by a certain populace or number of individuals in the AR environment. This may serve as a warning or caution to the notified individuals operating in the AR environment that the user 202 may not be aware of their presence and can provide a safety factor when the DR application 222 is operating. The notification may operate to prevent unwanted collisions between the user 202 and objects or persons physically in the AR environment.

In some embodiments, some third-party systems may have a policy against diminishment by a DR system such the DR application 222. Such systems may receive a notification from the DR application 222 or the notification system 224 that the third-party system has been diminished in the view shown to the user 202 by the DR application. The third-party system may respond with a communication indicating that no diminishment of the third-party system is permitted by a policy or other controlling authority. In example, the DR application 222 may attempt to diminish from the view shown to the user 202 an emergency vehicle such as a police car. The notification system 224 may advise equipment associated with the police car or other civil system about the diminishment so that the police car or police personnel are aware that the user 202 cannot see the police car in the AR environment. As a public safety policy, the local jurisdiction may prohibit diminishment of public safety vehicles or personnel and, as a result, the police car or other public safety system may respond to the notification system 224 with a communication specifying that the DR application 222 may not diminish the police car in the view of the user 202. The notification system 224 may advise the DR application 222 accordingly and the DR application 222 will respond by adjusting the view shown to the user 202.

In another embodiment, the notification system 224, alone or in combination with the DR application 222, may provide information about diminished objects or individuals in the form of a heatmap. This information may be provided to the user 202 or to a third party, such as a property owner. Any suitable visual or audible technique, or other means for notifying the user 202 and others about the diminishment of objects or individuals in the AR environment shown to the user 202 may be used. Such notification may be done to ensure the safety of the user 202 and other participants or those nearby. Such notification may be done to provide information such as statistical information about operation of the DR application 222 and the AR environment of the user 202.

In embodiments, the method 216 operates in a loop such as loop 255 including repetitive processing of step 240, step 244, step 246, step 248 and step 250. The method 216 continuously monitors activity in the AR environment including locations and movements of objects and persons in the AR environment, as well as interactions by the user 202 with items in the AR environment. The method may include providing profile update, step 250, and notifications, step 252 and step 254, for example, as the immersive experience continues for the user 202. Any combination of appropriate operations or functions may be repeated in one or more loops during operation of the method 216.

In some embodiments, an audit log may be maintained for the DR application 222, the user 202 or for the AR environment. The audit log may be established and maintained for a diminished item in the AR environment including context of the diminishment. The audit log may be stored in any suitable location, such as an audit log database 258 accessible over a network. Any suitable information may be stored in the audit log, in any format or combination of formats. The stored information may include identifying information for an object, item or person that has been processed by the DR application to be diminished. The stored information may include information about the reasons for the diminishment, including time information, location information, information about other persons or objects presented at the time and some record of the decision process by the DR application 222 to diminish the item. For example, if the user 202 requested diminishment at step 246, that information may be included in the audit log. Similarly, if the DR application 222 attempted to diminish the item but that was overridden by the user or a third party or policy, that information may be stored in the audit log as well.

With such information, the user 202 or an object, person or an automated system can inspect and understand reasons for the diminishment. Further, at step 260, the information from the audit log can be provided to the user 202. With such information, the user 202 can appeal future diminishments by the DR application 222 or establish a policy to never diminish particular objects, a class of objects, or the user 202 themself. The policy may be stored in the policy database 228 or a policy stored therein may be retrieved and updated according to specifications and information of the user 202.

In another example, the audit log stored in the database 258 may be used to evaluate or determine the popularity ascribed to certain metaverse objects. For example, such content popularity information may include statistics about which objects are seen or diminished in AR environments and may be used to modify or improve immersive experiences for future users such as user 202. The content popularity information may be stored in any suitable location such as database 264. The audit log information may be processed and manipulated in any convenient way, including through machine learning and artificial intelligence, to draw conclusions about the DR application 222, the user 202, the AR environment, etc. The processing may be done by the DR application 222, an augmented reality (AR) server 210 (FIG. 2A) or by any other system or processor.

In an example of usage of the method 216 or the system 200, a user is participating in an event such as a conference or concert. Because of a need for security at the event and the venue, security personnel and vehicles are present. Similarly, because of the need to maintain safety for participants and attendees, safety personnel may be present instead or in addition. Making use of the DR application 222 and a VR headset 204 or other user equipment, the security and safety personnel may be selectively diminished or made invisible to the user 202 viewing the event through the VR headset 204. This can be applied to any personnel or objects, such as event runners or management personnel. This can improve the engagement and satisfaction of the user 202 by eliminating distractions or incongruous sights from the view of the event.

In a further example, a scene in an AR environment of immersive experience viewed by multiple users including user 202 includes an image of a police car or police officer. Each user is associated with user equipment such as a VR headset, VR glasses or other display device. The DR application 222 controls all user equipment for users participating in the AR environment. The DR application 222 operates to selectively diminish one or more objects or items or persons in the scene, such as a police officer and a police car. The DR application 222 operates to synchronize or tune the user equipment of each user so that each user equipment consistently displays whatever image in the scene replaces the diminished items. Different users at different angles will see different views of the same object. For example, a user located behind the police car in the AR environment will see the rear of the police car. A user located in front of the police car in the AR environment will see the front of the police car. The DR application operates to generally erase the view of police car to users including the user 202.

In a further example, the DR application 222 cooperates with the object location management system 220 to include collision detection for those objects that are diminished in an AR environment or immersive experience. Without collision detection, unexpected consequences may occur due to being invisible to XR users including user 202. Such consequences may include a user 202 getting bumped into and hit by cars or other objects or persons in the AR environment. Such consequences may include the user 202 hitting objects or persons which are rendered invisible to the user by operation of the DR application 222. In embodiments, objects which are diminished by the DR application 222 so as to be invisible to user 202 may be made to be visible to automatic transport devices so that no collision may occur.

Any suitable collision avoidance process or device may be employed. In a first example, an item that is diminished and made invisible in a view of the AR environment may be made visible, or less invisible, in response to detection of an imminent collision. For example, the item may be shown to one or more users in outline or profile or highlighted to be made somewhat visible, but not completely visible. In another example, the relative visibility or transparency or opacity of the item may be adjusted in relation to the imminence of the collision.

In one exemplary embodiment, a user 202 is moving in an AR environment in which several items, including objects and persons, have been diminished or rendered invisible to the user 202 by the DR application 222. Locations and movement of the user 202 and other items in the AR environment are detected by the detector system 218 and reported to the object location management system 220. As the user 202 approaches an invisible item, the user's distance from the item is monitored by the object location management system 220, along with the user's direction of motion and velocity.

The object location management system 220 operates to detect and prevent a collision between the user 202 and the item. As the user's distance to the item falls below a threshold, such as 3 meters or 2 meters, the object location management system 220 signals the DR application 222 of the possible collision. The DR application 222 responds by making at least partially visible to the user 202 the item. For example, the DR application 222 may make the item visible in outline form. In another example, the item is rendered with a variable opacity. So long as the user 202 is more than a threshold distance away from the item, the item is completely invisible to the user 202. As the user's distance from the item falls below the threshold distance, the DR application 222 increases a visibility component such as the opacity of the item so it becomes visible to the user 202 as the user approaches the item. The DR application 222 may increase opacity in accordance with any suitable manner to ensure no collision occurs. For example, the DR application may increase opacity of the item linearly as the user approaches the item from a first distance threshold such as 10 meters to a second distance threshold, such as 3 meters. Opacity is gradually increased with decreasing distance so that at a distance of 3 meters between the user and the item, the item is fully visible to the user 202 in the VR headset 204 or other user equipment. Other visibility components that may be modified to provide an indication to the user of the possibility of collision include reducing blurring of the item, reducing pixelation of the item, intermittently returning to view an item which has been removed from view. Other notifications of the risk of collision may be included, such as audible notifications like a beep or other tone played through a speaker of the user equipment.

The object location management system 220 monitors location, direction of motion and velocity of motion of all moving objects in the AR environment, as well as the location of all stationary objects. In embodiments, this is done in three dimensions for all objects, including those about to enter the AR environment and those leaving the environment. This applies to visible objects as well as items that have been diminished or had their visual characteristics altered by the DR application 222. If the DR application 222, in cooperation with the object location management system 220, determines a mere bump may occur between a user and a diminished object, the DR application 222 may merely flash the outline of the diminished object to alert the user. The mere bump suggests no risk of injury or damage so only a minor warning is given. If a more solid collision is anticipated, including a collision that would cause damage or injury, based on speed and trajectory of moving objects, the DR application 222 may provide a more urgent warning. The invisible object may be made partially or fully visible. The warning may be given to any suitable users. For example, if only a single user is at risk of a collision, the DR application 222 may give a warning to only that user. If multiple users are at risk, the affected multiple users may be notified by the DR application 222. In some examples, all users may be notified if appropriate.

In an example, user 202 is viewing a concert in a venue with a security barrier or turnstile monitored by security personnel. Alternatively, the barrier and personnel may include a safety barrier and safety personnel to help maintain a safe environment and experience for all present. The DR application 222 operates to diminish the security barrier and the security personnel so that the user 202 can more fully enjoy the concert without the intrusion of the security barrier and security personnel into the view of the user 202. The user 202 may decide to move closer to the stage, a motion that would cause the user 202 to strike the security barrier, the security personnel, or both. The DR application 222, in cooperation with the object location management system 220, monitors the location and motion of the user 202 and other items in the scene. As the user 202 moves in the AR environment closer to the stage and security barrier and security personnel, the DR application 222 provides a visual warning to the user 202 of the impending contact. If the user is moving slowly, the visual warning may be just a high-lighting or outlining of the security barrier or the security personnel, or both. If the user 202 is running toward the stage and in danger of striking the security barrier or the security personnel, the DR application 222, in cooperation with the object location management system 220, identifies the risk and provides a more urgent warning to the user 202 to prevent the unintended collision. The DR application 222 may make the security barrier or security personnel fully visible or may cause the images of the security barrier and the security personnel to flash visibly or to be highlighted in a particular color. As the user 202 approaches closer, the flashing may become more intense, and an audible alarm or other alarms may be sounded.

In some applications, persons or devices which are rendered invisible or otherwise diminished by the DR application 222 may be fully visible to each other and fully able to view user such as user 202. In the immediate example, although the DR application 222 diminishes the security personnel and the security barrier from view of the user 202, the security personnel maintain full view of the user 202 and the security barrier. Thus, the security personnel can see the user 202 even though the user 202 cannot see them. This can assist in collision avoidance. The security personnel can stay a distance away from the user 202 in the AR environment. The security personnel can monitor the motion of the user and other users and objects in the AR environment and move accordingly to avoid collisions.

In another application, the DR application 222 may operate to replace or conceal some items at a performance or entertainment venue. For example, the DR application 222 may operate to make stagehands and additional equipment used to create special effects on theater stages invisible to the view of the user 202. The persons serving as stagehands may be identified and their motion tracked by the object location management system 220. They may move about the performance space to perform any suitable function such as creating special effects. Similarly, equipment may be employed to create special effects or add other aspects to the performance. The equipment may be diminished by the DR application 222 so that members of the audience, such as user 202, viewing the performance through user equipment, see the result but do not see the stagehands or the equipment. In some examples, the detector system 218 or object location management system 220 responds to specific patterns or fiducials of clothing worn by the stagehands or other personnel. The patterns or fiducials enable the detector system 218 or the object location management system 220 to detect location and movement of the personnel.

In some examples, the DR application 222, in cooperation with the object location management system 220, may adjust the apparent physics of objects seen by the user 202 in the AR environment. The physics experienced by an object or person may include forces acting on the object or person, including the force of gravity, as well as forces due to collisions among objects. In an example, the DR application 222 may use a time buffer to create the impression of slowing down or speeding up movement of an object, contrary to normal laws of physics. For example, a physical object such as a ball is thrown upward and it falls down normally, according to gravity. However, by operation of the DR application 222, the user 202 in the AR environment sees the ball float downward at a much slower velocity than the physical ball falls. The DR application 222 may operate to warp apparent motion of items in the AR environment to appear to modify the physics of objects in the AR environment.

In addition to invisibility or removing an object from view of a user, a system and method in accordance with embodiments herein may alter the appearance of an object for a variety of purposes. First, for collision detection, the appearance of the object may be modified from invisible to the user to partially visible or even visible and highlighted, depending on a risk of collision. Further, if an object or person is solely made invisible, additional problems are created if others in an AR environment are not aware of the presence of the object or person. Unintentional collisions, especially collisions that may cause damage or injury, should be avoided and that may require the system or method to make the person or object intermittently somewhat visible or otherwise manage collision avoidance. A system and method must not merely mask or render invisible an object but also must make sure the object can be avoided. The modification to the object may be based on the nature of the object, the presence of other objects in the environment and positioning and movement of all objects. For example, in an amusement park, all behind-the-scenes park personnel such as maintenance personnel and cleaning personnel are rendered invisible to park guests to enhance the magic experienced by the guests in the park. However, outside of the park boundaries, that rule for invisibility does not apply. A separate and different rule applies, and the park personnel are fully visible to park guests and to others. Rules for invisibility and altered appearance in the AR environment or in an immersive experience are dependent on the context of the object and the context of the viewer. Those contexts include location, time of day and all circumstance of interaction. As context for an interaction changes, the rules for the interaction and diminishment of objects change.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2C:
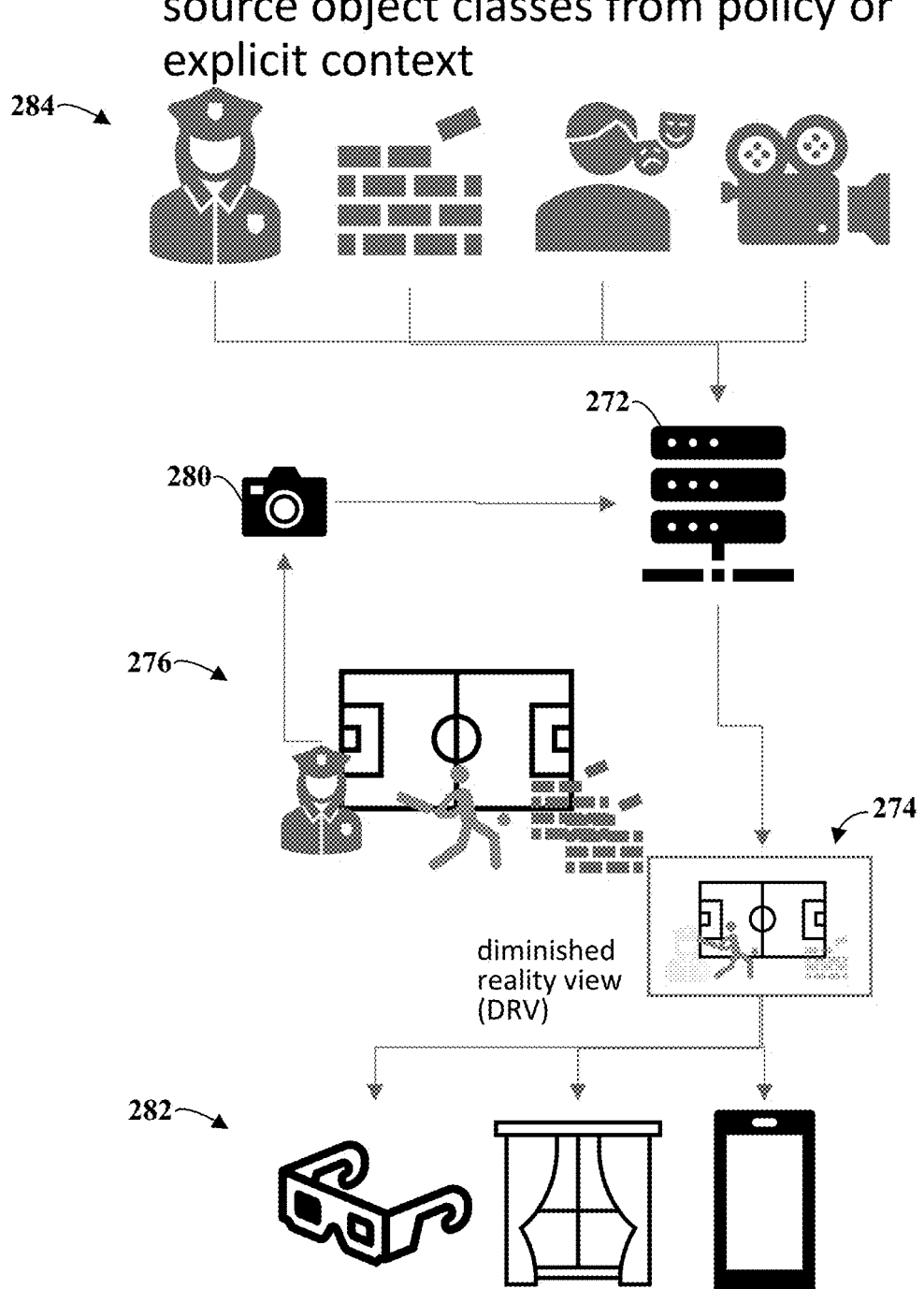
FIG. 2C is a block diagram illustrating an example, non-limiting embodiment of a system functioning, for example, within the communication network of FIG. 1 in accordance with various aspects described herein.

FIG. 2C is a block diagram illustrating an example, non-limiting embodiment of a system 270 functioning, for example, within the system 100 of FIG. 1 in accordance with various aspects described herein. System 270 includes a processing system 272 configured to provide and control an AR environment or immersive experience 274 based on or incorporating a physical environment 276. The system 270 further includes one or more sensors including a camera 280, environmental sensors, biometric sensors and other sensors suitable to detect conditions, objects and movements in the physical environment 276. The system 270 is operative to provide a diminished reality view (DRV) to one or more user devices 282. The system 270 facilitates the removal of visual objects with diminished reality (DR) to create view modifications while keeping those view modifications well-coordinated among participants.

The processing system 272 receives information about objects 284 that may be present in the physical environment 276. Such objects may include persons and physical objects such as walls and support columns. In particular examples, persons present in the physical environment 276 may include persons who may be hidden or rendered invisible or reduced in their visual presence. Examples of such persons include security personnel, stagehands, maintenance personnel and any individuals or group of persons who should be unobtrusive for at least part of the time in the immersive experience 274. Examples of physical objects to be visually removed include walls, vehicles, either moving or stationary, structural supports and furniture. The processing system 272 operates to diminish from view of a user or participant in the immersive experience 274 particular objects or persons. The system 270 including the processing system 272 allows for the ability to hide from view in the immersive experience objects that are both stationary and moving for improved immersion in the immersive experience. In examples, this may include the hiding of safety materials, equipment, and even actors to create an immersive level of creativity not limited by visual hindrances or distractions.

Further, the system 270 enables collision detection to protect invisible objects and diminished reality equipment-wearer from colliding. The processing system 272 coordinates deleted or diminished content against a position of the user and targets avoidance of collisions. Further, the system 270 enables the ability for a user in an immersive experience to interact with physical objects in the same physical environment 276 without being seen by other participants in the immersive experience. The processing system 272 coordinates one or more visible physical or virtual objects and invisible physical objects, creating new illusions, facilitating strategic or streamlined audio and video production, such as removal of a projector, speaker, microphone, or camera from the image seen by a user.

In embodiments, the processing system 272 receives information about objects 284 that the system may detect in the physical environment 276 with a user. The information about the objects 284 may come from any suitable source of information. In one example, sensors including camera 280 provide information including images and data to the processing system 272. In another embodiment, information about classes of source objects may be received from a source. The information about classes of source objects may be at any level of generality, such as a very high level like "a six-feet tall vertical wall," or "human in police uniform." Further, the information about classes of source objects may be related to a role of an object or person in the physical environment 276, such as defining an actor in an on-stage drama. The information about classes of source objects may come from any suitable source such as a policy established for a particular user or participant in the physical environment or the immersive experience 275. The policy may store information in any suitable format and may be retrieved, for example, as a data file from a database either located locally or accessed over a network.

In the exemplary embodiment of FIG. 2C, a view of the physical environment 276 is partially blocked by a security team member and by a wall. The processing system 270 has received information about objects 284, in a policy or other source. Further, the processing system 270 has additional information about the physical environment. Such additional information may include view information from the camera 280 or view information from user equipment the user whose view of the physical environment is blocked. The processing system 270 operates to resolve the requested identity to be diminished based on the information received. The processing system 270 produces the view of the immersive experience 274. In the example, the view of the immersive experience 274 is a diminished reality view in which the security team member and the wall in the physical environment 276 have been diminished. In the example, diminishing the security team member and the wall includes rendering them invisible to a viewer or participant in the immersive experience. In other embodiments, diminishing the security team member and the wall may include reducing their prevalence in the immersive experience 274 or changing their appearance in the immersive experience 274. The processing system 270 operates to display the immersive experience through a user device such as VR goggles, a windows-type device or a portable user device such as a smartphone.

Systems and method in accordance with the aspects described herein provide a wide variety of benefits. In one example, the system and method can operate to lower technological barriers for creative contributors such as actors, directors content creators who create visual art. The ability to remove or diminish visual distractions in a scene can open up new possibilities for telling a story or presenting information which may have been blocked or unworkable using conventional technology. Further, the system and method take advantage of a new visual dimension that previously did not exist for content creators. The ability to diminish objects in a scene gives the content creator additional tools to resolve or solve issues for preparing and recording a visual scene. For example, lighting design for concerts and other events may be done using Unreal Engine software. This provides the ability to diminish or render invisible one or more objects or people or even an entire orchestra in an immersive simulation of the actual venue. Other new services may be developed to take advantage of the ability to take advantage of invisible objects in an environment.

In another aspect, use of the disclosed system and method can provide improved security without impacting the environment of an event. In an AR environment, security personnel and equipment may be physically present but may be diminished and made invisible to participants. The security personnel and equipment are available if needed to handle any situation, but they remain unobtrusive and out of sight of viewers. Further, if a situation requires their attention, changing the security personnel and equipment from invisible to partially visible, fully visible or highlighted in the view may operate as a show of force sufficient to defuse the situation or interfere with the situation.

Similarly, the disclosed system and method enable the presence of necessary equipment in certain settings, such as entertainment venues, sporting events and theaters, without being visible to the viewer or customer at the setting. For example, crane equipment necessary to lift props or set elements can be diminished so that, despite being located physically adjacent the stage, they are virtually invisible to the audience.

In another example, the system and method enable an improved user view of an environment by automatic removal of visual hindrances or obstructions in a view. For example, a viewer whose view from a stadium seat is obstructed may have the view enhanced by the method and apparatus. In another example, at a stadium, a rival team may be flying flags in the rival team colors. The system and method may selectively remove those items from the scene and even remove the team colors from the rival players' uniforms. This may be done according to preference of the user.

In some applications, information about users' reaction to an object may be used for future planning and operation. For example, information may be collected about numbers of times an object is viewed and then diminished by viewers. That information may be linked to public appeal, such that, for example, the more an object is diminished from AR environments, the more the object can be added to potential civil rejection or warning list. A predictive algorithm processing images may conclude that, since previous viewers do not wish to see a particular object, that particular object should be automatically diminished from future views. The statistics or other information serves as an indicator or audience reaction to an object and may be used to adjust how the object is presented in the future.

In another example, a diminished reality filter may be developed based on input information and can be reused for specific situations or patterns of items to delete from a view. For example, social media information may be used to determine the appeal or desirability of viewing an item of group of items. When a user experiences that item or group of items, the view is automatically filtered by diminishing the item or group of items. The filter may act as a template for a particular view which can be modified by individual users according to their profile or user-selected settings.

In another example, a marketplace may be developed for diminished reality items displayed, or not displayed, in immersive experiences provided to users. For example, a service provider who provides such immersive experiences to users may render invisible or diminish all instances of a particular brand name or product. In response to a fee or other consideration, the service provider may reverse or remove the diminishment so that the brand name or product becomes visible. Sellers of competing brands or products may bid for the opportunity to have their brands or products displayed in the immersive experience. The operation to reverse the diminishment may be tied to other factors such as makeup of the audience. For example, an immersive experience that includes images of alcoholic beverages may have those made visible to a viewer, unless the viewer is under age 21 or other legal drinking age. The viewer's age or other status information may be retrieved from a profile, for example, and used to tailor the operation of an automatic diminishment process accordingly.

In another example, the AR environment may include a portion of a public setting. An example is an entertainment event such as a concert or place or speaking program in which some audience members use AR user equipment to enhance the event. The information defining and controlling the AR environment is controlled for all participants in the audience by a common controller, such as AR server 210 (FIG. 2A). The common controller ensures that all participants have a similar experience and can enjoy the added features of the augmented reality experience. For security purposes, the common controller may employ DR functionality such as provided by DR application 222 to create an observation area that is not visible to participants. The observation area is located in the same physical space as other participants in the event, such as the audience members, performers on stage, support personnel such as stage-hands and security personnel.

In this example, the DR functionality can create an observation area or a service area that is not visible to participants viewing the event in the AR environment. The observation area or a service area is rendered invisible through diminished reality. The observation area or a service area may be used by security personnel or support personnel to establish a presence at the event. However, the presence of such personnel does not impact participants unless needed. The observation area may be located in any convenient location, including among audience members. If support personnel or security personnel are needed, they are immediately at hand and can assist. This is in contrast to conventional arrangements where security and support facilities are maintained well out of site, often outside a venue or on a different floor of the venue. Further, this use of DR functionality allows a broader view of a performance or other event. For example, structures such as support poles, protective glass, and window frames can be rendered invisible and removed from for immersive access by the audience.

In another example, the system and method may operate to prevent the inappropriate use of invisibility, ensuring appropriate security protocols are in place for identified restricted areas. One example is a bathroom or public showers, where any use of invisibility is automatically prohibited. This could be introduced as an automatic feature in cameras and even be specified as a feature that cannot be overridden for any purpose. Some zone may be defined in which no augmented reality is permitted or in which the modification of views such as by diminished reality is limited or completely foreclosed. Privacy should be protected for users and the public alike.

In another example, automatic control of diminished reality operation may be provided based on factors such as permissions, copyrights and trademarks. Locations or regions may be defined, such as be geofencing, in which control of diminishment is based on such factors. For example, if a user is in a public environment viewing the environment in an XR headset, the system and method may automatically remove from the user's view any persons who have not consented and given express permission to be viewed in that manner, in that location or any other context. In another example, a brand owner's trademark rights may require that the user view the trademarks or logos of the brand owner while the user is viewing the AR experience. This may be overridden if the user pays a fee or other consideration. Similarly, an owner of a copyrighted work such as a film or other video production may limit and control the extent to which the work may be viewed in the AR environment.

Figure 3:
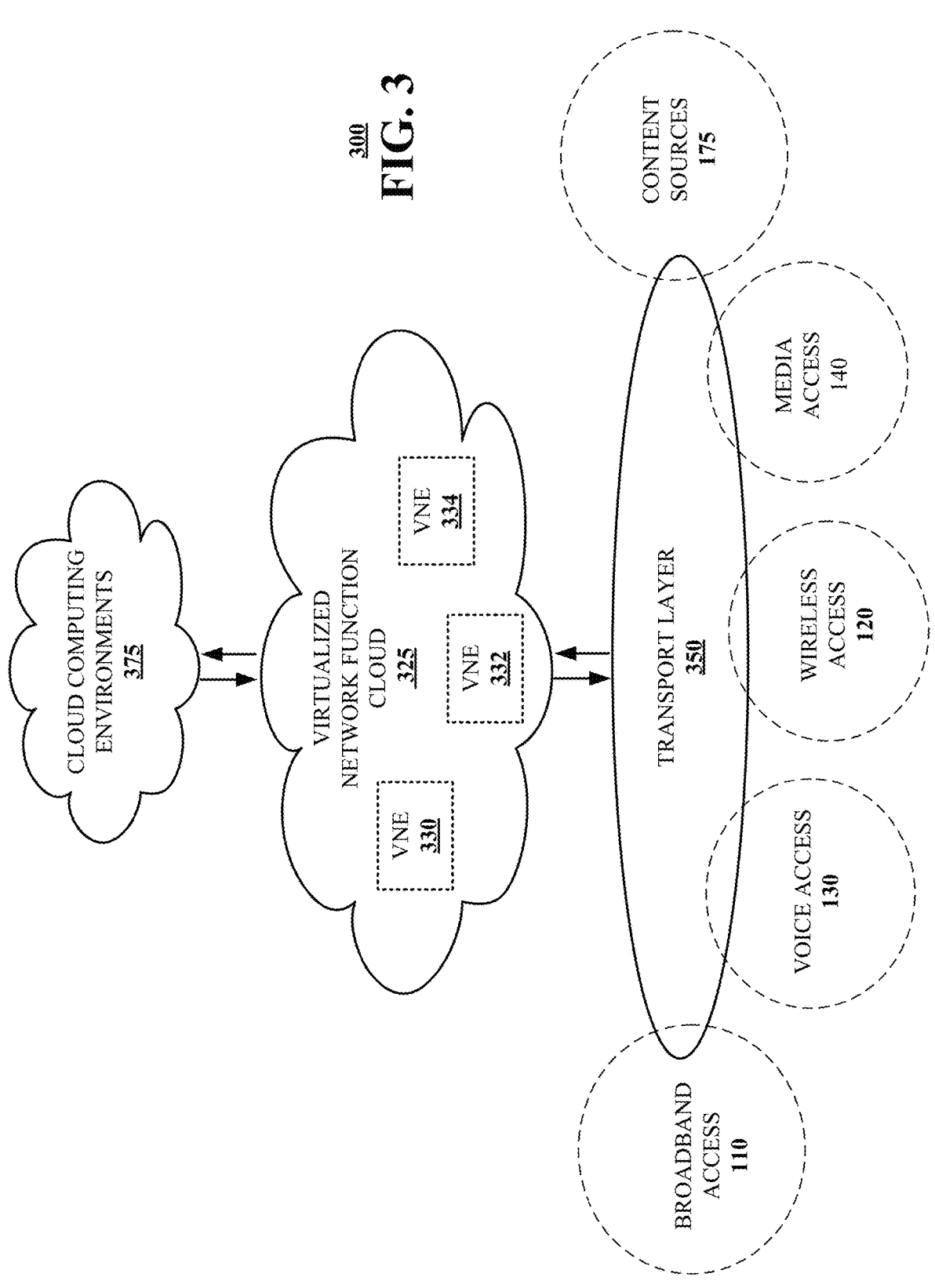
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network 300 is presented that can be used to implement some or all of the subsystems and functions of system 100, the subsystems and functions of system 200, and method 216 presented in FIGS. 1, 2A, 2B, 2C and 3. For example, virtualized communication network 300 can facilitate in whole or in part receiving information about an augmented reality environment including a user and a plurality of objects and identifying a diminished reality object in the augmented reality environment. The diminished reality object is rendered invisible to the user in the augmented reality environment and location and movement of objects in the augmented reality environment are monitored to avoid collisions with the diminished reality object.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
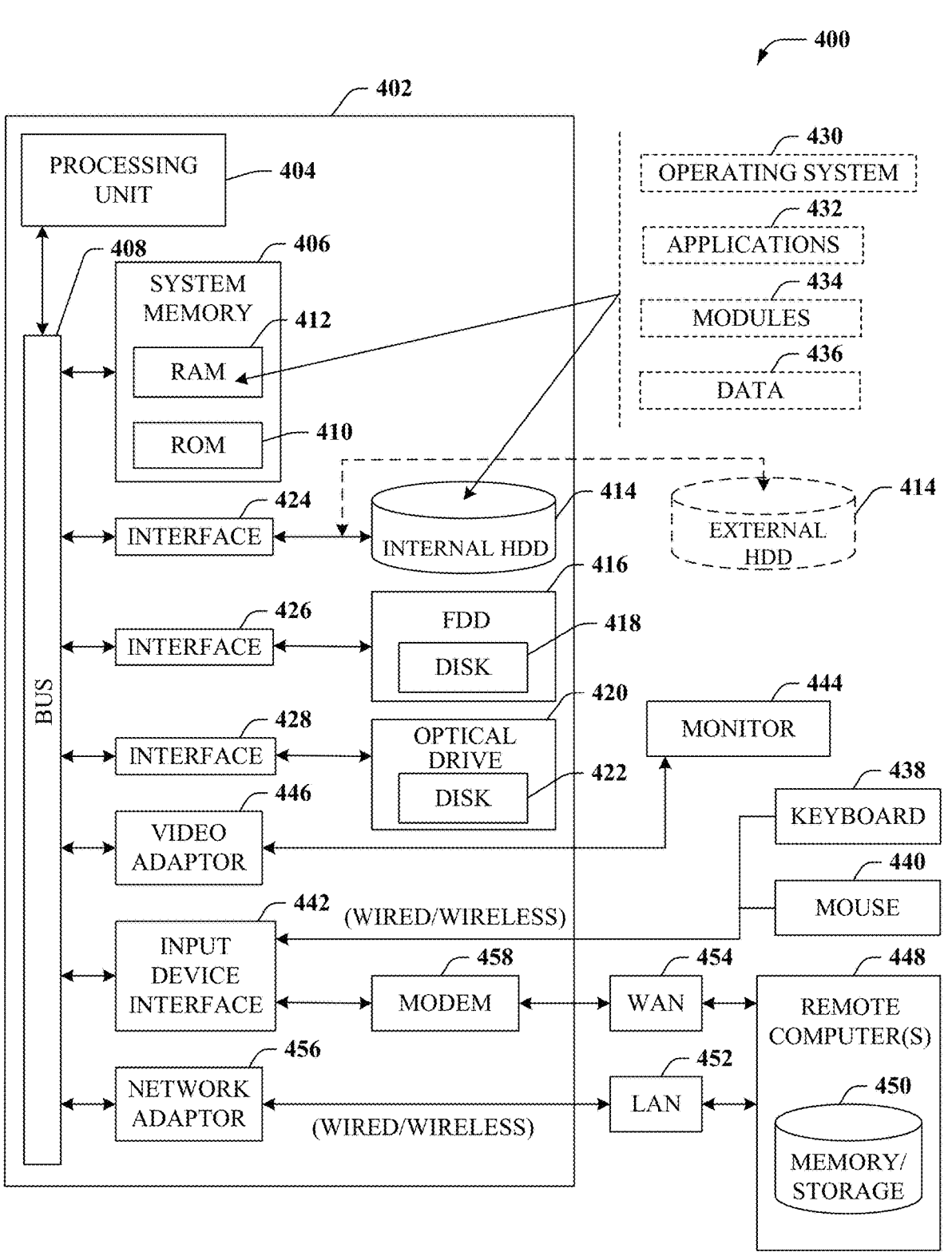
FIG. 4 is a block diagram of an example, non-limiting embodiment of a computing environment in accordance with various aspects described herein.

Turning now to FIG. 4, there is illustrated a block diagram of a computing environment 400 in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part receiving information about an augmented reality environment including a user and a plurality of objects and identifying a diminished reality object in the augmented reality environment. The diminished reality object is rendered invisible to the user in the augmented reality environment and location and movement of objects in the augmented reality environment are monitored to avoid collisions with the diminished reality object.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
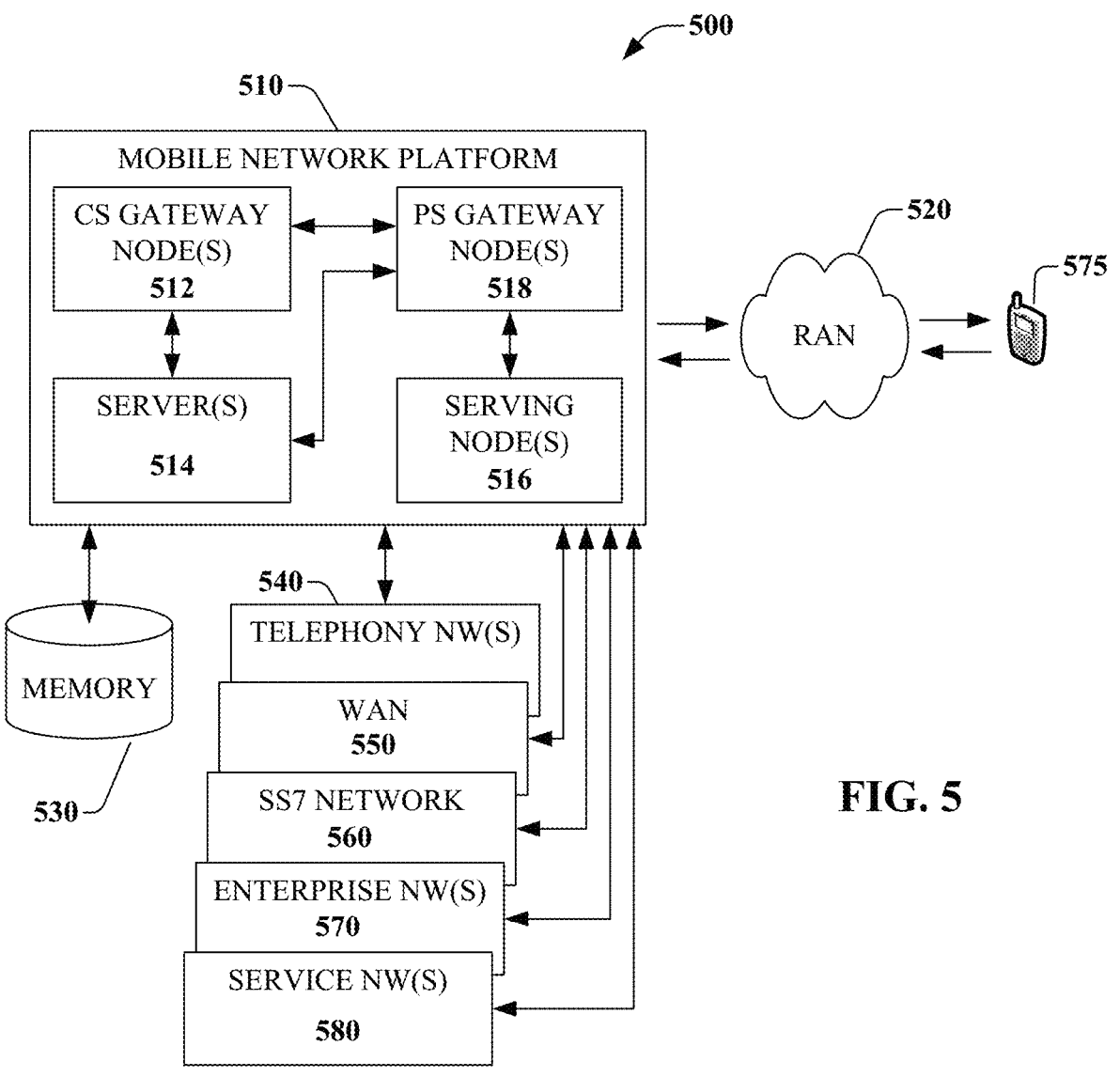
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part receiving information about an augmented reality environment including a user and a plurality of objects and identifying a diminished reality object in the augmented reality environment. The diminished reality object is rendered invisible to the user in the augmented reality environment and location and movement of objects in the augmented reality environment are monitored to avoid collisions with the diminished reality object. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
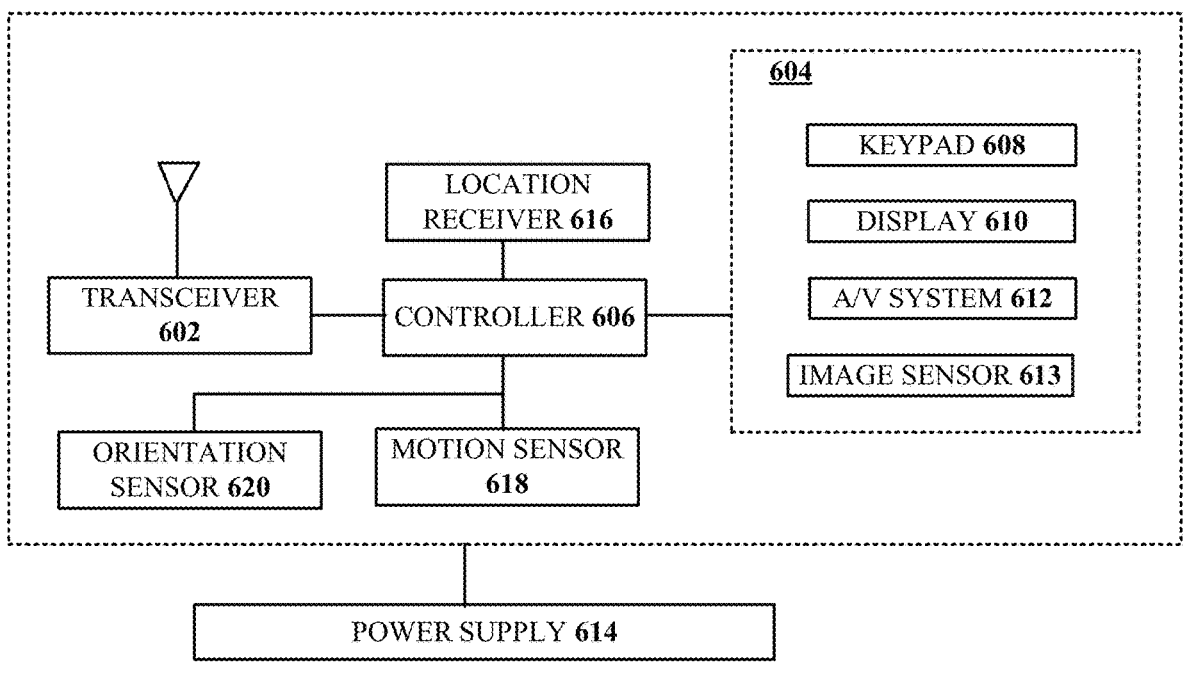
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part receiving information about an augmented reality environment including a user and a plurality of objects and identifying a diminished reality object in the augmented reality environment. The diminished reality object is rendered invisible to the user in the augmented reality environment and location and movement of objects in the augmented reality environment are monitored to avoid collisions with the diminished reality object.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x) = \text{confidence (class)}$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
obtaining information about an augmented reality (AR) environment and a user participating in the AR environment, the AR environment including a plurality of physical objects;
obtaining biometric information that measures a biometric aspect of the user;
responsive to the biometric aspect of the user, determining a first physical object of the plurality of physical objects to diminish;
rendering the first physical object invisible to the user in the AR environment, wherein the rendering the first physical object invisible to the user in the AR environment comprises removing the first physical object from a view of the AR environment provided to a user equipment of the user;
obtaining historical information about past activities and places visited by the user, the historical information including historical content;
identifying the first physical object based on the historical information; and
substituting the historical content for the first physical object for the user viewing the AR environment through the user equipment.

2. The device of claim 1, wherein the rendering the first physical object invisible to the user in the AR environment further comprises:
replacing the first physical object with another object in the view of the AR environment provided to the user equipment of the user.

3. The device of claim 1, wherein the operations further comprise detecting a risk of a possible collision between the user and the first physical object, and notifying the user of the possible collision.

4. The device of claim 3, wherein the detecting the risk of the possible collision between the user and the first physical object comprises:
monitoring movement of objects of the plurality of physical objects in the AR environment; and
monitoring a distance between the user and the first physical object as the user, the first physical object, or both, move in the AR environment.

5. The device of claim 3, wherein the notifying the user of the possible collision comprises:
rendering the first physical object at least partially visible in response to determining that a distance between the user and the first physical object is less than a threshold distance.

6. The device of claim 5, wherein the notifying the user of the possible collision further comprises:
detecting that the distance between the user and the first physical object is decreasing; and
rendering the first physical object increasingly visible to the user in the AR environment in response to the detecting that the distance between the user and the first physical object is decreasing.

7. The device of claim 1, wherein the obtaining information about the AR environment comprises:

obtaining information identifying the AR environment as including a theatrical presentation;

identifying, in the AR environment, one or more support personnel associated with the theatrical presentation;

identifying the one or more support personnel as diminished reality (DR) theater objects of the AR environment; and rendering the DR theater objects invisible to the user in the AR environment to enhance the theatrical presentation for the user.

8. The device of claim 1, wherein the obtaining information about the AR environment comprises:

identifying, in the AR environment, one or more support personnel associated with the AR environment;

identifying the one or more support personnel as diminished reality (DR) support objects of the AR environment; and rendering the DR support objects invisible to the user in the AR environment.

9. The device of claim 8, wherein the obtaining information about the AR environment further comprises:

obtaining information identifying the AR environment as including a sporting event;

obtaining information identifying the DR support objects as referees for the sporting event; and rendering the DR support objects invisible to the user in the AR environment.

10. The device of claim 1, wherein the removing the first physical object from the view of the AR environment provided to the user equipment of the user comprises pixelating the first physical object in the view of the AR environment provided to the user equipment of the user.

11. A non-transitory, machine-readable medium, comprising executable instructions that, when executed by a processing system including a processor, facilitate performance of operations, the operations comprising:

obtaining information about an augmented reality (AR) environment and a user participating in the AR environment, the AR environment including a plurality of physical objects;

obtaining biometric information that measures a biometric aspect of the user;

responsive to the biometric aspect of the user, determining a first physical object of the plurality of physical objects to diminish;

rendering the first physical object invisible to the user in the AR environment, wherein the rendering the first physical object invisible to the user in the AR environment comprises removing the first physical object from a view of the AR environment provided to a user equipment of the user-;

obtaining information identifying safety personnel and safety equipment;

identifying the safety personnel and the safety equipment as diminished reality (DR) support objects; and rendering the DR support objects invisible to the user in the AR environment.

12. The non-transitory, machine-readable medium of claim 11, wherein the operations further comprise:

monitoring location and motion of the plurality of physical objects in the AR environment;

detecting a risk of a possible collision between the user and the first physical object, wherein the detecting the risk of the possible collision is based on the monitoring location and the motion of the plurality of physical objects; and notifying the user of the risk of the possible collision.

13. The non-transitory, machine-readable medium of claim 12, wherein the notifying comprises:

modifying a visibility of the first physical object to the user employing the user equipment to view the AR environment.

14. The non-transitory, machine-readable medium of claim 13, wherein the modifying the visibility of the first physical object to the user comprises one or more of:

blurring the first physical object in the view of the AR environment provided to the user equipment;

pixelating the first physical object in the view of the AR environment provided to the user equipment; and replacing the first physical object with another object in the view of the AR environment provided to the user equipment.

15. The non-transitory, machine-readable medium of claim 11, wherein the operations further comprise:

obtaining information identifying the AR environment as including a live entertainment presentation viewed by the user in the AR environment;

identifying, in the AR environment, one or more support personnel associated with the live entertainment presentation;

identifying the one or more support personnel as diminished reality (DR) support objects of the AR environment;

rendering the DR support objects invisible to the user employing the user equipment to view the AR environment to enhance the live entertainment presentation for the user; and maintaining visibility of remaining objects of the plurality of physical objects to the user employing the user equipment to view the AR environment.

16. The non-transitory, machine-readable medium of claim 11, wherein the operations further comprise:

obtaining historical information about past activities and places visited by the user, the historical information including historical content;

identifying the first physical object based on the historical information; and substituting the historical content for the first physical object for the user viewing the AR environment through the user equipment.

17. A method, comprising:

obtaining, by a processing system including a processor, information about an augmented reality (AR) environment and a user participating in the AR environment, the AR environment including a plurality of physical objects, the user viewing the AR environment through a user equipment;

obtaining, by the processing system, biometric information that measures a biometric aspect of the user;

responsive to the biometric aspect of the user, determining, by the processing system, a first physical object of the plurality of physical objects to diminish; and rendering, by the processing system, the first physical object invisible to the user in the AR environment, wherein the rendering the first physical object invisible to the user in the AR environment comprises removing the first physical object from a view of the AR environment provided to the user equipment;

obtaining, by the processing system, historical information about past activities and places visited by the user, the historical information including historical content;

identifying, by the processing system, the first physical object based on the historical information; and substituting, by the processing system, the historical content for the first physical object for the user viewing the AR environment through the user equipment.

18. The method of claim 17, wherein the obtaining information about the AR environment comprises:

obtaining information identifying safety personnel and safety equipment;

identifying the safety personnel and the safety equipment as diminished reality (DR) support objects; and rendering the DR support objects invisible to the user in the AR environment.

19. The method of claim 17, further comprising:

obtaining, by the processing system, user input identifying the first physical object.

20. The method of claim 17, further comprising:

obtaining, by the processing system, geographic location, time of day, and identification of individuals or objects present in the AR environment, as a context information; and subsequently obtaining, by the processing system, updated context information, the updated context information indicating a change in context for the AR environment from the context information; and modifying, by the processing system, the AR environment to render the first physical object visible to the user viewing the AR environment through the user equipment, wherein the modifying is responsive to the change in context for the AR environment.

\* \* \* \* \*